United States Patent [19]

Carruthers

[11] Patent Number: 4,560,008
[45] Date of Patent: Dec. 24, 1985

[54] ROOT CROP HARVESTER
[75] Inventor: John Carruthers, Roslin, Scotland
[73] Assignee: National Research Development Corp., London, England
[21] Appl. No.: 653,470
[22] Filed: Sep. 20, 1984

Related U.S. Application Data

[63] Continuation of Ser. No. 420,573, Sep. 20, 1982, abandoned.

[30] Foreign Application Priority Data

Sep. 24, 1981 [GB] United Kingdom ............... 8128854

[51] Int. Cl.⁴ ........................................... A01D 17/00
[52] U.S. Cl. ................................. 171/14; 56/327 R; 171/130
[58] Field of Search ................. 171/14, 127, 130, 126; 56/327 R

[56] References Cited

U.S. PATENT DOCUMENTS

| 509,082 | 11/1893 | Heald | 130/27 AE |
|---|---|---|---|
| 2,043,978 | 6/1936 | Barber | 130/21 |
| 2,209,282 | 7/1940 | Rodin | 171/130 |
| 2,269,298 | 1/1942 | Widuch | 171/14 |
| 2,587,918 | 3/1952 | Stout | 209/416 |
| 2,617,425 | 11/1952 | Dion | 130/27 AE |
| 2,793,747 | 5/1957 | Pridy | 171/130 |
| 3,071,196 | 1/1963 | Scheidenhelm | 171/120 |
| 3,109,434 | 11/1963 | Strever | 130/24 |
| 3,159,270 | 12/1964 | Johnston | 171/127 |
| 3,199,604 | 8/1965 | Lorensen et al. | 171/127 |
| 3,301,331 | 1/1967 | Looker et al. | 171/127 |
| 3,469,383 | 9/1969 | Manfre | 171/14 |
| 3,473,613 | 10/1969 | Boyce | 171/14 |
| 3,931,857 | 1/1976 | O'Hare et al. | 171/14 |
| 4,147,017 | 4/1979 | Cortopassi et al. | 171/14 |
| 4,174,755 | 11/1979 | Siri | 171/127 |
| 4,244,165 | 1/1931 | McElwain | 171/14 |
| 4,355,647 | 10/1982 | Heidjann et al. | 130/24 |

FOREIGN PATENT DOCUMENTS 1601478 10/1981 United Kingdom .

OTHER PUBLICATIONS

Journal of Agriculture, (1977), by M. B. McGechan, entitled "An Investigation into the Relative Effectiveness of Various Riddling Motions for Removal of Soil from Potatoes".

Primary Examiner—Paul J. Hirsch
Attorney, Agent, or Firm—Cushman, Darby & Cushman

[57] ABSTRACT

A root crop harvester includes an endless soil-separating conveyor-sieve and agitator means for agitating the conveyor-sieve so as to move to and fro the crop-bearing upper run of the conveyor-sieve substantially in the plane of said upper run.

10 Claims, 10 Drawing Figures

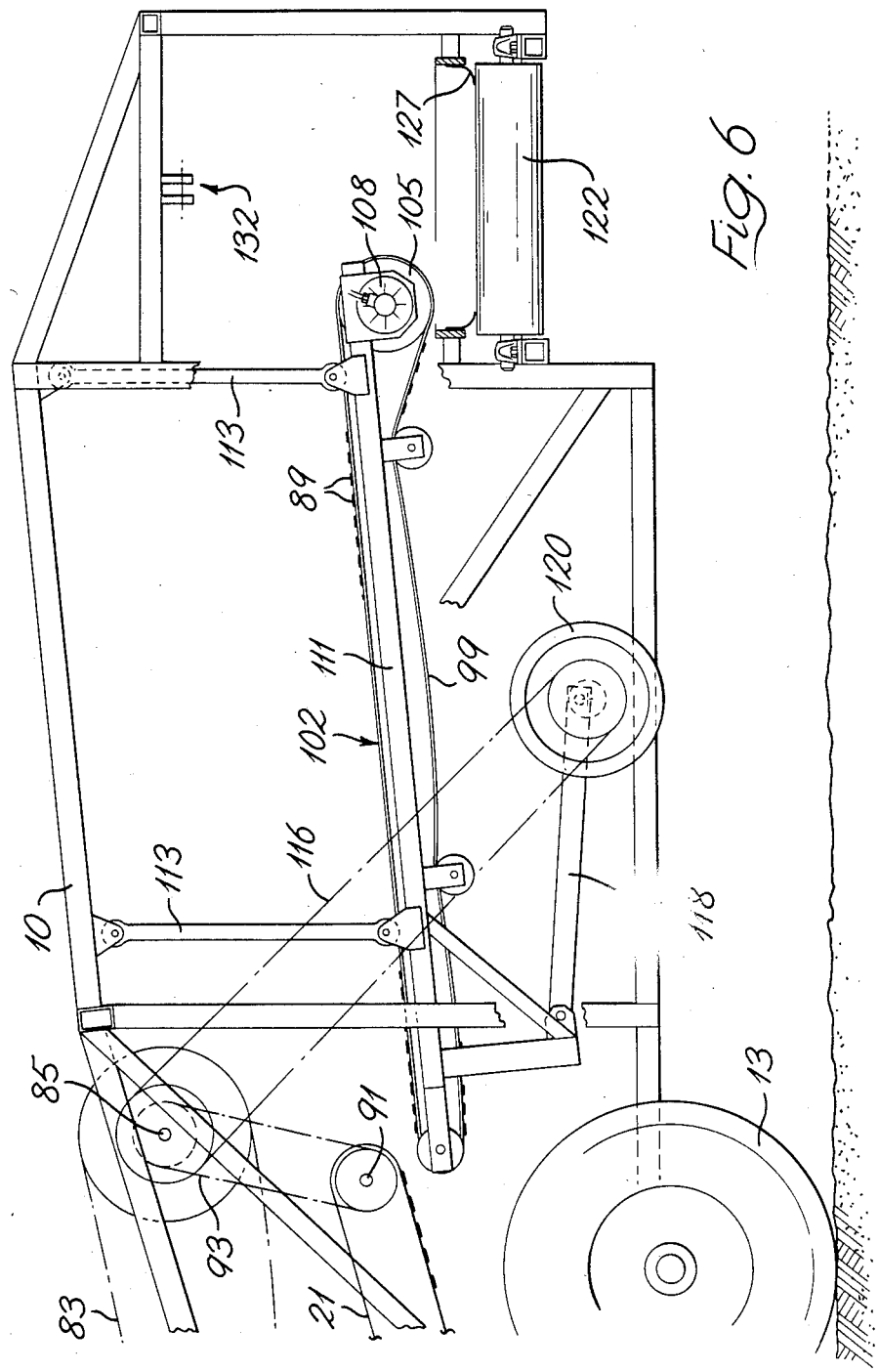

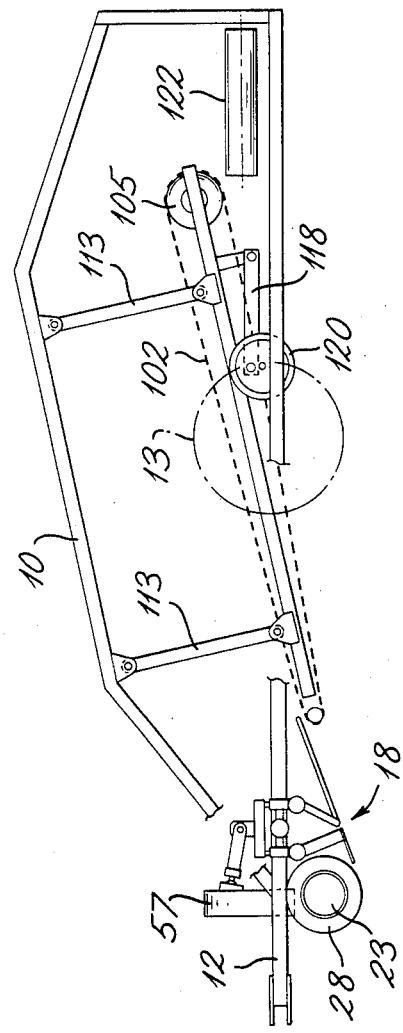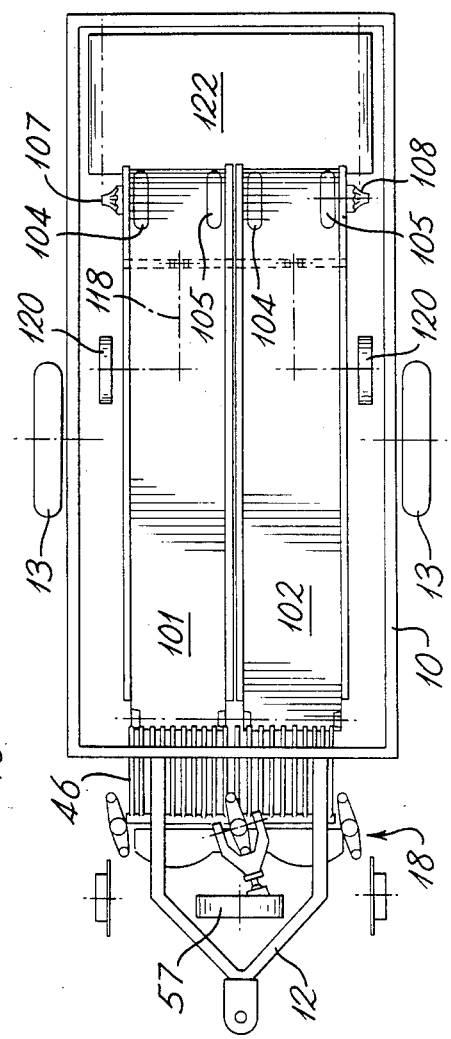

ROOT CROP HARVESTER

This is a continuation, application Ser. No. 420,573, filed Sept. 20, 1982 now abandoned.

The present invention relates to root crop harvesters and in particular to unmanned root crop harvesters.

The elevator web of a conventional potato harvester has the twin duties of lifting the material to the next stage of the harvester and of removing the loose soil. Soil removal is usually assisted by running the web over a series of elliptical sprocket wheels which provide vertical agitation of the crop bearing surfaces of the web. It has now been suggested that this vertical agitation is largely responsible for damage to the harvested potatoes in their journey through this part of the sieving machine. Thus damage can vary from scuffing, in which only the skin of the potato is damaged, to severe flesh damage in excess of 1.5 mm depth.

An object of the present invention is to provide a root crop harvester in which damage to the crop is significantly reduced or substantially avoided.

According to the present invention, a root crop harvester includes an endless soil-separating conveyor-sieve and means for agitating the conveyor-sieve so as to move to and fro the crop bearing upper run of the conveyor-sieve substantially in the plane of said upper run.

Conveniently, the agitator means includes or is associated with adjustment means enabling the amplitude and/or frequency of the agitation to be varied to suit different crop and/or soil conditions.

Conveniently, the to and fro movement of the upper run of the conveyor-sieve is in a direction lengthwise of the harvester.

Conveniently, the desired in-surface agitation movement is allowed by having the or each soil-separating conveyor-sieve suspended on a swinging-link suspension arrangement.

Clearly, the length of the suspension links and the amount of swing should not be such as to conflict with the overall requirement that the crop-bearing upper run of the or each conveyor-sieve should be agitated substantially in the plane of the upper run.

Conveniently, the or each soil-separating conveyor-sieve comprises a series of laterally-spaced web tines each presenting a convex surface to the crop.

Preferably, the radius of curvature of this convex surface should be not less than 16 mm and not more than 23 mm although surfaces with values a few millimeters outside this range may also be advantageous.

The curved crop-bearing dimension of the web tines is conveniently of the order of 25 mm.

The web tines may be of circular or any other convenient cross-section e.g. upwardly bowed.

The optimum separation of the web tines will depend on the soil conditions and the crop being harvested and might typically vary from 25 to 34 mm for harvesting potatoes, say, to 20 to 22 mm for harvesting carrots and onions. The quoted values are measured between corresponding parts of adjacent web tines, e.g. from the leading edge of one tine to the leading edge of the adjacent tine.

In a first embodiment of the invention, the or each conveyor-sieve receives the crop from a transport conveyor designed to carry the crop from the crop-lifting means of the harvester with little or no significant soil separation.

Conveniently, the web tines of the or each transport conveyor have similar or identical cross-sections to the web tines used in the or each conveyor sieve though the tine-to-tine spacing may be different.

In a second embodiment of the invention, the or each conveyor-sieve receives the crop direct from the crop-lifting means of the harvester. In this case, the dimensions of the harvester will conveniently be such as to result in a conveyor-sieve slope of not more than 15° to the horizontal, values of around 10° or less being preferred.

Conveniently, the soil-separating conveyor-sieve is one of two such conveyor-sieves and includes agitator means adapted to drive the conveyor-sieves in to and fro motions which are 180° out of phase with one another.

Conveniently, the two conveyor-sieves are arranged side by side though not necessarily in the same plane.

Conveniently, the overall conveying motions of each of the conveyor-sieves is in a widthwise direction of the harvester.

Conveniently, the overall conveying motions of the two conveyor-sieves are in opposite widthwise directions in which case the first of the two conveyor-sieves is preferably arranged to discharge on to the second of the two conveyor-sieves.

Conveniently, the harvester includes deflector means for diverting material on the first conveyor-sieve over the side of said conveyor-sieve and on to the second conveyor-sieve.

In an alternative arrangement, the overall conveying motion of each of the two conveyor-sieves is in a direction lengthwise of the harvester e.g. rearwards of the harvester.

Conveniently, in these alternative arrangements, the two conveyor-sieves discharge onto a common transverse conveyor.

Conveniently, the crop-lifting means of the harvester comprises a twin-share disc as hereinafter described.

As an alternative, the crop-lifting means of the harvester may comprise one or more tranversely-oscillating shares e.g. forming part of a share and tine bar assembly in which the tine bars receive material directly from the one or more shares and oscillate in anti-phase (i.e. 180° out of phase) to the one or more shares.

Conveniently in this latter case, the shares and the tine bars of the assembly are supported by opposite sides of a parallelogram linkage.

It is expected that the better sieving capacity likely to be associated with root crop harvesters in accordance with the present invention will lead to an improved throughput when compared with conventional designs of root crop harvester.

Embodiments of the invention will now be described, by way of example only, with reference to the accompanying drawings in which:

FIG. 6 is a simplified side elevation of the rear end of the harvester showing the separator webs and their method of mounting in the harvester;

FIGS. 7 and 8 are simplified side and plan views of a second embodiment of the invention.

Figure 1:
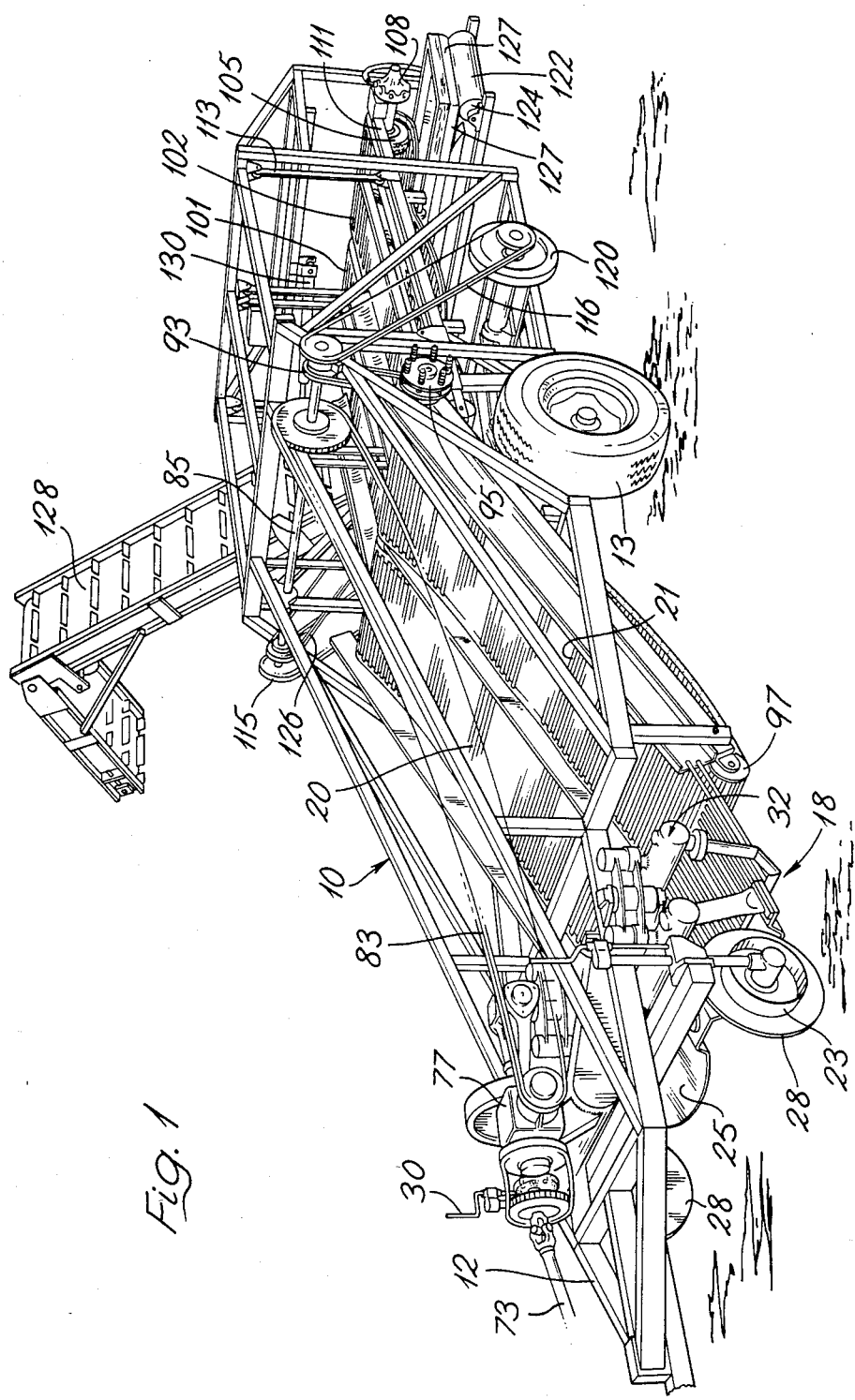
FIG. 1 is a perspective view of a root crop harvester according to a first embodiment of the invention.
Figure 2:
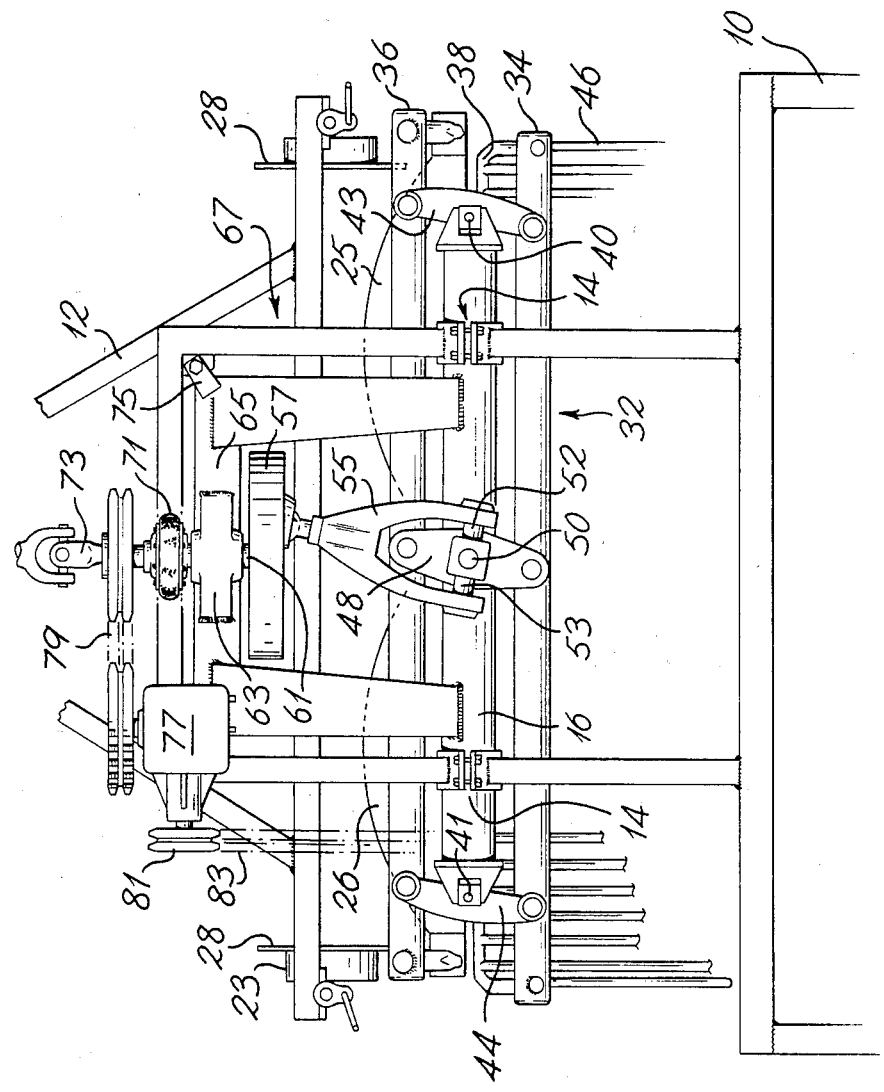
FIG. 2 is a plan view of the share and tine bar assembly at the front end of the harvester.

Referring first to FIGS. 1 and 2, reference numeral 10 indicates the chassis or main frame of the harvester which at its front end includes a frame portion 12 leading to a hitch point (not shown) for the towing tractor. Reference numeral 13 indicates the ground wheels of the harvester.

At its rear end, frame portion 12 is clamped at 14 to the cross-bar 16 of a share and tine bar assembly 18 which is designed to lift the crop from the ground and discharge it on to the lower end of a pair of upwardly-inclined transport webs 20, 21.

Depth wheels 23 are fitted close to the shares 25, 26 to control the digging action of the shares, and discs 28 limit the share action and prevent spillage to the sides of the shares. Hand-operated jacks 30 provide for vertical adjustment of the depth wheels and discs.

In essence, the assembly 18 comprises a parallelogram linkage 32, the leading long link 34 of which supports the two shares 25, 26 and the trailing long link 36 of which carries a tine bar 38 set fairly close to shares 25, 26. Cross heads 40, 41 extend upwardly from the bar 16 to provide centre pivots for the short links 43, 44 of the linkage.

The tines 46 supported by bar 38 are large diameter spring steel tines spaced apart at regular intervals chosen to suit the crop being harvested and it will be observed from FIG. 1 that the end tines of the assembly are arranged above the level of the intermediate tines to reduce crop losses from the sides of the assembly.

The shares 25, 26 are set to correspond to the centre lines of adjacent rows of the crop to be harvested and enough space is present between the leading long link 34 and the shares 25, 26 on the one hand, and between the trailing long link 36 and the tine bar 38 on the other hand to allow the crop ridge to pass through.

In operation, the tine bar and shares of assembly 18 are oscillated 180° out-of-phase with one another in a horizontal direction lying substantially perpendicular to the overall line of travel of the harvester.

This motion is produced by oscillating a third short link 48 of the parallelogram linkage pivotally connected to the mid-points of long links 34, 36 and connected to the mid-point of cross bar 16 by a third cross head 50. This latter element carries side arms 52, 53 which extend perpendicularly to link 48 to provide stub axles for the embracing arms of a Y-shaped yoke member 55. In operation, the base of the stem of the yoke member will be moved in a circular path by a flywheel 57 to which it is connected by a ball and socket connection 59, the resulting three diaensional twisting movement of the yoke member being converted into a two dimensional oscillatory movement of the link 48 by the pivotting action of the yoke about arms 52, 53.

The support shaft 61 for flywheel 57 is supported in a bearing 63 secured to the cross member 65 of a sub-assembly 67 which is rigidly connected to cross bar 16 by two arms 69 of the assembly. A doughnut-shaped torsional shock absorber 71 connects shaft 61 to a second shaft 73 designed for connection to the power take-off of the towing tractor.

The amplitude of the equal and opposite oscillatory motions of the two longer links 34, 36 of the parallelogram linkage 32 and the shares and tines supported by them can be varied if desired by altering the relative proportions of the links 34, 36 and/or by repositioning the ball and socket connection 59.

An adjustment plate connection 75 between sub-assembly 67 and the main frame 10 allows the share and tine bar assembly 18 to be pivotally adjusted about the axis of cross bar 16, clamps 14 being slackened off and retightened during the adjustment process as appropriate. Typical inclinations for the shares and tines of assembly 18 lie in the range 11° to 22° to the horizontal.

On the opposite side of the sub-assembly to adjustment plate 75, the sub-assembly 67 carries a right-angled gear box 77 which is driven from the shaft 73 by a double chain and sprocket drive 79. The output shaft of the gear box drives the sprocket 81 of a chain and sprocket connection 83 between gear box 77 and a lay shaft 85 towards the rear of the harvester.

The transport webs 20, 21 on to which the tines 46 discharge their load are moved upwardly by four cog wheels (two for each belt) which intermesh with the web tines 89. The cog wheels are mounted on a common shaft 91 (FIG. 6) which is driven from the lay shaft 85 by a chain and sprocket connection 93 acting through an audible slip clutch 95. The purpose of this latter item is to alert the operator of the machine to any malfunctioning at the transport web stage.

At their lower ends, the transport webs are supported on freewheeling stub axle cones 97 (FIG. 1) which engage the rubber belts 99 on which the web tines 89 are supported. Typical inclinations for the transport webs lie in the range 17° to 25° to the horizontal, as low a value as a convenient being preferred.

Figure 5:
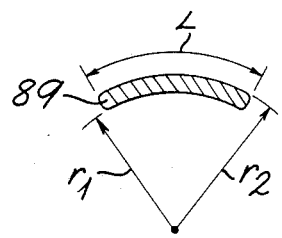
FIG. 5 is a cross-section, to a greater scale than FIGS. 3 and 4, of one of the web tines in the transport webs.

The generally convex form of the web tines 89 is best seen from FIG. 5 where the values r1, r2 and L are typically 13 mm, 16 mm and 25 mm respectively. With these values, the spacing, e.g. from leading edge to leading edge, of adjacent web tines 89 is typically in the range 22-24 mm, as low a value as convenient being preferred.

The transport webs are intended to convey material upwards with only minimal separation. For this reason, the webs are not agitated in the vertical mode as is normal on a potato harvester and the speed of the transport webs is designed to be as near land speed as possible though it need not be accurately controlled.

Figure 3:
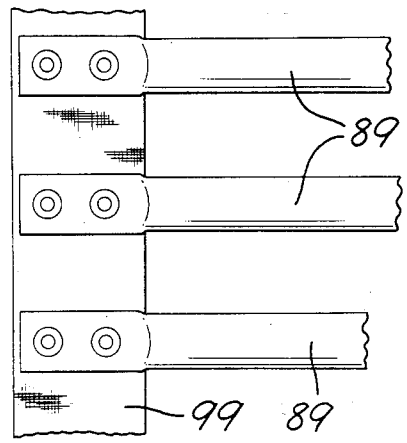
FIGS. 3 and 4 are plan and side views of part of the transport webs, illustrating their detailed structure.
Figure 4:
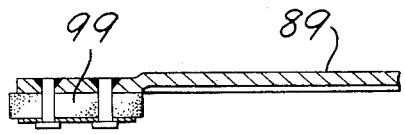

At their upper ends, the transport webs discharge the material to be separated on to two near-horizontal separator webs 101, 102 which, like the conveyor webs, are also constructed from slightly convex spring steel tines 89 mounted on high tensile rubber belts 99. In this respect it is important to realise that FIGS. 3 to 5 are equally valid as views of the separator webs although, as already explained, the tine to tine spacing may be different from that illustrated.

Typical inclinations for the separator webs lie in the range 0° to 15° to the horizontal, values at the lower end of the range being preferred.

In operation, the separating webs are each driven by two pneumatic tyred wheels 104, 105 driving on the inner edges of the web tines. This method of driving provides a built-in over-load facility as well as a means of easily driving webs of various tine spacing and type to suit season, crop and size range of material to be harvested. The drive for pneumatic tyred wheels 104, 105 is provided by two variable speed hydraullc motors 107, 108 piped in series to give an equal speed drive to the two separating webs.

The wheels 104, 105 and their driving motors 107, 108 are mounted in individual box frame structures 110, 111, each suspended from the main frame 10 by four pivoted arms 113 enabling the structures 110, 111 and hence the separator webs 101, 102 to be oscillated in line with the crop-conveying upper surface of the web. Because of the relatively long length of the arms 113 (two feet, say) and their relatively small in-line displacement (typically 1½ inches either way), the motion of webs 101, 102 will have only a negligible component in directions perpendicular to the crop bearing surface of the webs and the principal cause of tuber damage present in conventional potato harvesters will have been substantially eliminated.

The oscillating drive to the frame structures 110, 111 (as opposed to the rearward drive for webs 101, 102) is supplied by two adjustable crank pins mounted on respective flywheel assemblies (one on each side of the machine). These latter are driven from the lay shaft 85 by appropriate chain and sprocket drives 115, 116. The crank pin 118 and flywheel 120 for the web 102 are best seen in FIG. 6. Typical oscillation rates for the two separator webs would be 300 oscillations per minute but the vibration effect of these webs on the remainder of the machine is significantly reduced by having the two webs oscillating 180° out of phase with one another.

The magnitude of the oscillation of each frame structure 110, 111 can be adjusted by adjusting the position of the crank-pin heads on the flywheels 120 where they are secured by a suitable clamping arrangement. In one such arrangement, for example, the magnitude of the oscillation of each frame can be adjusted from nought to three inches peak to peak by adjusting the position of the crank pin head in a V-shaped groove of the clamp where it is held at the selected position by a screw-mounted pressure plate. The frequency of oscillation of the frame structures can also be varied by changing the sprockets and chain sizes in the drive from lay shaft 85. Typical flywheel speeds lie in the range 150 to 450 revs per minute.

The time that the material to be separated will remain on the oscillating separating webs can be altered by adjusting the speed of the webs to ensure that the stones, soil and clods are removed through the inter-tine spaces before discharge of the tubers on to the cross conveyor 122 at the rear of the machine. Typically the webs 101, 102 would move rearwardly at or near the land speed of the harvester e.g. 2 m.p.h.

The cross conveyor 122 is supported on two rollers of which only one roller (roller 124) is visible in FIGS. 1 and 6. The other roller, which is the drive roller for the cross conveyor, is driven through a right-angled gear box (not visible) by the chain and sprocket drive 126 from the lay shaft 85.

Flexible skirts 127 are provided to prevent material spilling off the cross conveyor.

At its discharge end, the cross conveyor 122 unloads its contents on to a coventional elevator 128 which is also driven through a chain and sprocket connection from the output shaft of the same right-angled gear box. The inclination of the elevator 128 may be varied if desired by a ram 130 (FIG. 1) acting between the elevator and an appropriate lug 132 (FIG. 6) on the frame 10.

Although a three-stage system has been described above using a particular form of laterally oscillating crop pick-up and riddle, intermediate transport webs and a pair of in-line oscillating separation webs, various alternatives to this arrangement are possible without losing the advantages provided by the present invention. For example the initial crop pick-up and riddle assembly could be replaced by any suitable alternative design currently available including the twin disc arrangement of FIGS. 9 and 10. Similarly the suspension system for the separating webs could be varied to provide transverse rather than in-line oscillation of these webs.

Another possiblity is to omit the transport webs altogether and one such embodiment is in fact shown in FIGS. 7 and 8 where the share and tine bar assembly 18 and the separating webs 101, 102 are substantially identical to those shown in the embodiment of FIGS. 1 to 6 except that the nearly horizontal separating webs of that embodiment have now each been replaced by a somewhat greater length of the same web more steeply inclined to give the desired lift to the cross conveyor 122 at the rear of the machine.

Because of the basic similarity between the embodiments of FIGS. 1 to 6 and FIGS. 7 and 8, the same reference numerals have been used to indicate functionally and/or structurally similar items in the two embodiments and no separate description of the structure and operation of the second embodiment has been included.

Figure 9:
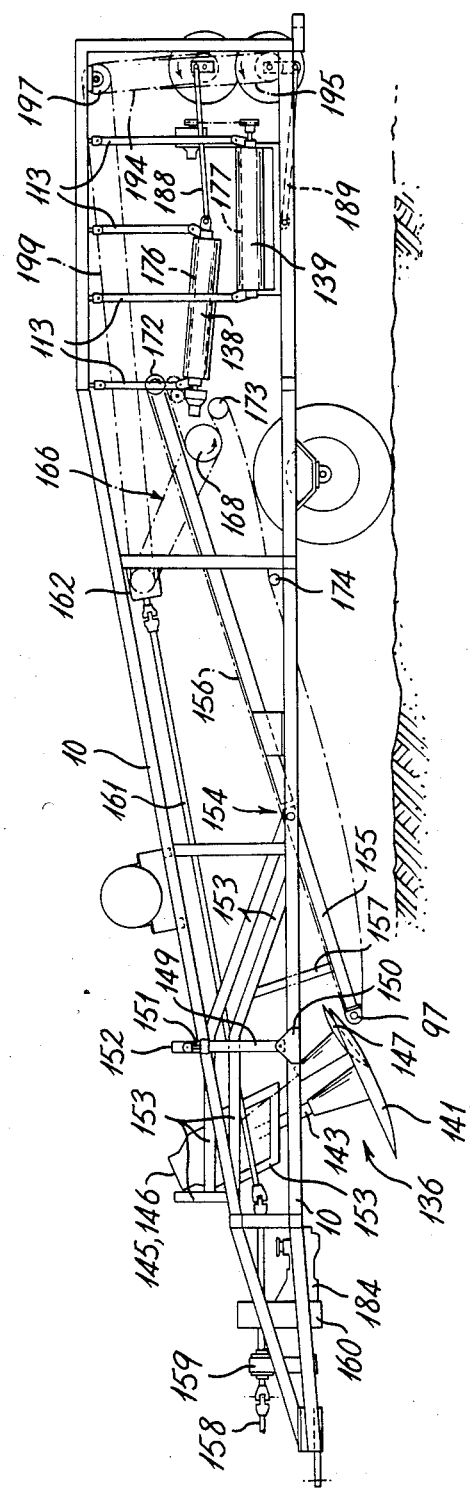
FIGS. 9 and 10 are side and plan views of a third embodiment.
Figure 10:
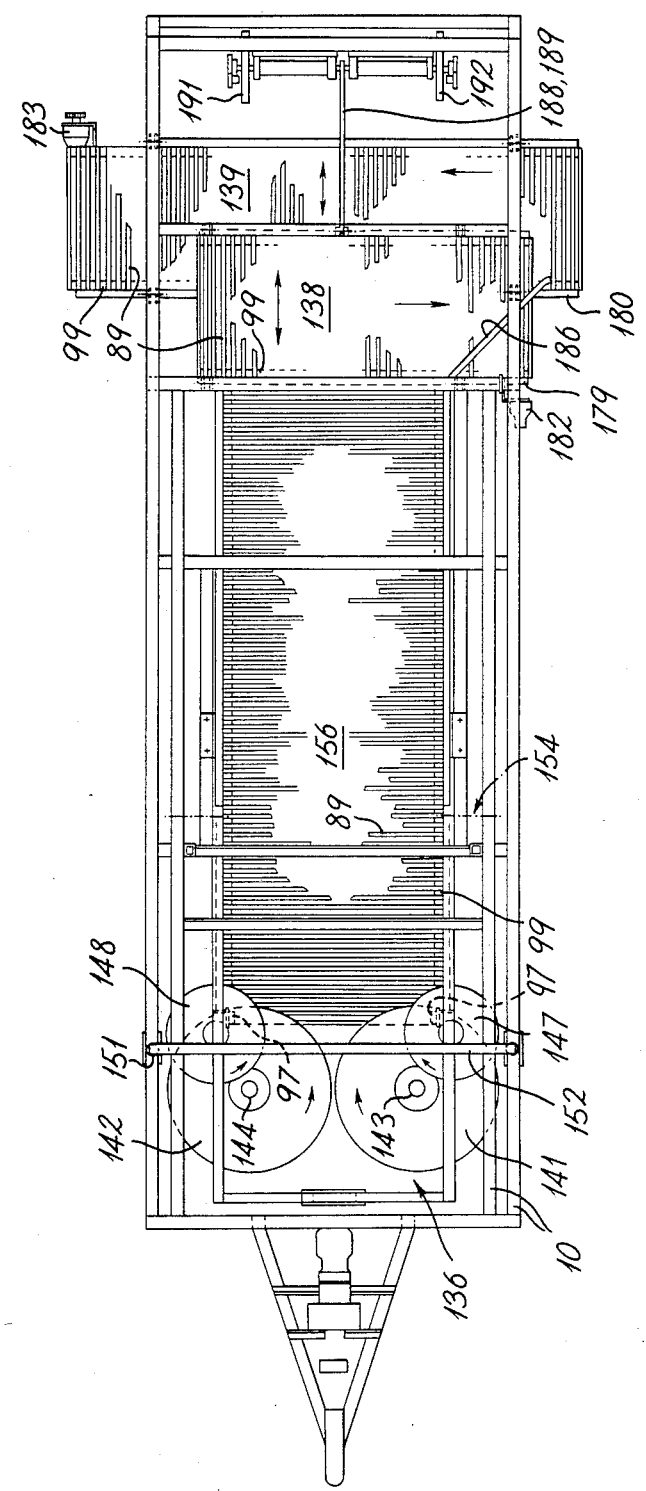

The embodiment of FIGS. 9 and 10 differs from that of FIGS. 1 to 6 described above in using a disc assembly 136 in place of the reciprocating share assembly 18 and in having the two separator sieves 138, 139 disposed widthwise of the machine although they are still vibrated in a fore and aft motion lengthwise of the machine. As before, where convenient, the same reference numerals have been used to indicate functionally and/or structurally similar items in the two embodiments.

In more detail, the share disc assembly 136 comprises a pair of concave upwardly dished disc-type digger shares 141, 142 each supported by a forwardly and upwardly inclined axle 143, 144 driven from a respective hydraulic motor 145, 146. The same motors drive the downwardly concave cleaning discs 147, 148 which overlap and engage, or nearly engage, the upper surfaces of disc shares 141, 142.

A pneumatic jack 149 is provided to move the disc shares into and out of the soil at the beginning and end of a harvesting run. As will be seen from FIG. 9, the ram cylinder is pivotally connected to the harvester chassis 10 by upstanding lugs 150 while the ram piston 151 is pivotally connected to a cross beam 152 (see also FIG. 10) of a disc-supporting motor-supporting frame 153 pivotally connected at 154 with the harvester chassis 10.

A lower section 155 of the frame 153 supports the foremost section of the upwardly inclined transport web 156, the remainder of which is supported from chassis 10. Thus operation of jack 149 as above described will also lower and raise the front end of web 156 by exactly the same amount as the discs 141, 142 thereby maintaining the web/disc spacing at the desired value.

Reference numeral 157 indicates a cross strut between the two sections of frame 153.

In operation, the various discs of assembly 136 will rotate in senses such as to convey material lifted by the digger shares 141, 142 rearwardly on to the upwardly inclined transport web 156. For further details of suitable designs of share disc assembly for the embodiment of FIGS. 9 and 10, reference should be made to UK Pat. No. 1601478 and to pending UK Patent Application Nos. 8212478 and 8212479.

The drive to the transport web 156 originates from a p.t-o driven input shaft 158. This latter is connected via a shock coupling 159 and gear box 160 to a transmission shaft 161 driving the input shaft of a right-angled gear box 162.

The output shaft of the gear box 162 is connected via a chain and sprocket connection 166 with the drive shaft for the transport web sprockets 168 which intermesh with the web tines. As before, an audible slip clutch may be incorporated to alert the operator to any malfunctioning at the transport web stage.

At its lower end, the transport web 156 is again supported on freewheeling stub axle cones 97 (FIG. 10) which engage the rubber belts 99 on which the web tines 89 are supported. Idler sprockets 172, 173, 174 complete the web support arrangement. The generally convex form of the web tines 89 is again best seen from FIG. 5.

Typical inclinations for the transport web lie in the range 17° to 25° to the horizontal, as low a value as convenient being preferred.

As in the previous embodiments, the transport web 156 is intended to convey material upwards with only minimal separation and the same precautions regarding vertical agitation and transport speed are observed.

At its upper end, the transport web discharges the material to be separated on to the first of the transversely disposed horizontal separator webs 138 sidewardly inclined as shown in FIG. 9 towards the second separator web 139. These laterally disposed separator webs, like the transport web, are also constructed from slightly convex spring steel tines 89 mounted on high tensile rubber belts 99 and in this respect it is again important to realise that FIGS. 3 to 5 are equally valid as views of the tranverse separator webs 138, 139 although, as before, the tine-to-tine spacing may be different from that illustrated.

The separator webs 138, 139 are carried on support rollers 176, 177 mounted in respective box frame structures 179, 180. These latter are suspended from the main frame 10 of the harvester by four pivoted arms 113 enabling the structures 179, 180 and hence the separator webs 138, 139 to be oscillated in line with their crop conveying upper surfaces.

The support rollers 176, 177 for separator webs 138, 139 are powered by two variable-speed hydraulic motors 182, 183 bolted to box frame structures 179, 180 and piped in series to give an equal speed drive to the two separating webs, typically of about 3 feet per second.

Reference numeral 184 indicates a p.t-o driven hydraulic pump for all the hydraulic motors appearing in the machine.

As indicated in FIG. 9, the motors 182, 183 drive the separator belts in opposite directions with material from the first belt 138 being deflected for discharge on to the second belt 139 by an inclined deflector plate 186 (FIG. 10). This motion is encouraged by having the support rollers 176 for belt 138 slightly tilted towards belt 139 as indicated in FIG. 9. Because of the relatively long length of the arms 113 (two feet, say) and their relatively small in-line displacement (typically 1½ inches either way), the motion of the separator webs 138, 139 will have only a negligible component in directions perpendicular to the crop bearing surfaces of the webs and the prinicpal cause of tuber damage present in conventional potato harvesters will have been substantially eliminated.

The oscillating drives to the box frame structures 179, 180 are supplied by crank pins 188, 189 mounted on respective flywheel assemblies 191, 192 to give the desired 180° phase difference between the oscillating webs. Chain and sprocket drives 194, 195 connect the flywheel assemblies with a drive assembly 197 itself driven via a chain and sprocket connection 199 from the output shaft of gear box 162.

Typical oscillation rates for the two separator webs would be 300 oscillations per minute but the vibration effect of these webs on the remainder of the machine is significantly reduced by virtue of the fact that the two webs are oscillating 180° out of phase with one another.

As in the earlier embodiments, the magnitude of the oscillation of each box frame structure 179, 180 can be adjusted by adjusting the position of the crank pin heads on the flywheels 191, 192 to which they are secured. Similarly, the frequency of oscillation of the box frame structures can be varied by changing the sprockets and chain sizes in the drive from assembly 197.

Typical flywheel speeds lie in the range 150 to 450 revs per minute.

The time that the material to be separated will remain on the oscillating separate webs can be altered by adjusting the speed of the webs to ensure that the stones, soil and clods are always removed through the intertine spaces before discharge of the tubers from the separator web 139 at the rear of the machine.

Conveniently, discharge will be on to a conventional elevator (not shown) coneniently also driven via a chain and sprocket connection from the output shaft of gear box 162.

The harvesters illustrated in the drawings are intended as two row trailed power take-off driven models suitable for two 36 inch rows. However, if desired, the two shares 25, 26 (FIG. 1) or 141, 142 (FIGS. 9 and 10) could be replaced by a single flate share and the machine could then be used for beds based on 72 inch wheel centres (e.g. for harvesting carrots or onions).

Other possible changes are also envisaged. For example the swing-link suspension for the separator webs could be replaced by any other suitable suspension resulting in the same sort of in-surface agitation, e.g. one comprising upstanding swing-links or a suitable guide and roller bed system.

It is also envisaged that the oscillating separator webs might instead form part of a fixed (non-mobile) installation to which the root crop is brought for separation as above described. Thus in accordance with another aspect of the invention there is provided a fixed nonmobile installation for separating root crops from earth and stones, the installation comprising an endless soil separating conveyor-sieve and agitator means for agitating the conveyor-sieve so as to move to and fro the crop bearing upper run of the conveyor-sieve substantially in the plane of said upper run. In one such case, the conveyor-sieve is loaded from one end and the to and fro movement referred to is lengthwise of the conveyor-sieve. In another example, the conveyor-sieve is loaded from the side and the to and fro movement is along the width of the conveyor-sieve.

Conveniently, fixed installations according to the present invention might include any of the features outlined above in respect of the harvester excepting those relating to the propulsion of the harvester over the ground or to the crop-lifting means and associated parts.

There might also be a place for a self-propelled harvester incorporating the essential features of the towed models as described above.

The scope of the invention is to be interpreted as including towed and self-propelled versions of the harvester as well as the fixed installations referred to above.

I claim:

1. A root crop harvester including means for removing the crop from the soil and discharging the removed crop, first, second and third conveyor means for receiving the crop discharged by said removing means and for transporting and separating the crop from soil so that the crop can be discharged for collection, whereby the crop moves sequentially from the first to the second and thereafter to the third conveyor means, said second conveyor means including a transversely disposed horizontal conveyor-sieve for moving the crop in a first widthwise direction following receipt of the crop from said first conveyor means, said second conveyor means also acting as a sieve and including drive means for driving said second conveyor means and means for suspending and oscillating said second conveyor means so that said second conveyor means is oscillatable in a direction substantially along a plane parallel with the upper crop supporting surface thereof, said second conveyor means discharging directly onto said third conveyor means so that the later can directly discharge the crop from the harvester.

2. A root crop harvester as in claim 1, wherein the oscillation motion of said second conveyor means is in a direction lengthwise of the harvester.

3. A root crop harvester as in claim 1, wherein at least said second conveyor means is comprised of a conveyor sleeve including a plurality of laterally spaced web tines each of which presents a convex surface to the crop.

4. A root crop harvest as in claim 1, wherein said first conveyor means deposits the crop onto said second conveyer means with little or no significiant soil separation.

5. A root crop harvester as in claim 1, wherein said second conveyor means further includes an inclined deflection member positioned adjacent the end of said conveyor-sieve for deflecting the crop directly toward and onto said third conveyor means.

6. A root crop harvester as in claim 5, wherein said third conveyor means includes a drive means for driving said third conveyor means and means for suspending and oscillating said third conveyor means so that said third conveyor means is oscillatable in a direction substantially along a plane parallel with the upper crop supporting thereof.

7. A root crop harvester as in claim 6, wherein said third conveyor means is driven in a second widthwise direction directly opposite to said first widthwise direction of said second conveyor means, so that the crop thereon will be moved in the opposite direction and thereafter is directly discharged from the harvester.

8. A root crop harvester as in claim 7, wherein said second conveyor means is angled downwardly toward said third conveyor means.

9. A root crop harvester as in claim 6, wherein said second conveyor means is oscillated at a rate of about 300 oscillations per minute.

10. A root crop harvester as in claim 7 whereby said second and third conveyor means are oscillated in a direction lengthwise of the harvester.

* * * * *

UNITED STATES PATENT AND TRADEMARK OFFICE
CERTIFICATE OF CORRECTION

PATENT NO. : 4,560,008
DATED : December 24, 1985
INVENTOR(S) : John Carruthers

It is certified that error appears in the above—identified patent and that said Letters Patent is hereby corrected as shown below:

Column 3, Line 54, change "diaensional" to -- dimensional --.

Column 4, Line 64, change "variab1e" to -- variable --;
"      "      "      "      change "hydraullc" to -- hydraulic --.

Column 8, Line 35, change "flate" to -- flat --.

Column 9, Line 24, change "later" to -- latter --.

Column 9, Line 31, change "sleeve" to -- sieve --.

Column 10, Line 1, change "harvest" to -- harvester --.

Column 10, Line 16, after "supporting" insert -- surface --.

Signed and Sealed this

Fifth Day of August 1986

[SEAL]

Attest:

DONALD J. QUIGG

Attesting Officer

Commissioner of Patents and Trademarks